US009911110B2

(12) United States Patent
Scott et al.

(10) Patent No.: US 9,911,110 B2
(45) Date of Patent: Mar. 6, 2018

(54) PREDICTING APPROVAL OF TRANSACTIONS

(71) Applicant: Square, Inc., San Francisco, CA (US)

(72) Inventors: J. Bryan Scott, San Francisco, CA (US); Jevin C. Bhorania, San Francisco, CA (US); Raymond Knight Mason, III, San Francisco, CA (US); Ariana Poursartip, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 0 days.

(21) Appl. No.: 13/786,262

(22) Filed: Mar. 5, 2013

(65) Prior Publication Data
US 2014/0258118 A1    Sep. 11, 2014

(51) Int. Cl.
*G06Q 20/20* (2012.01)
*G06Q 20/32* (2012.01)
(Continued)

(52) U.S. Cl.
CPC ......... *G06Q 20/204* (2013.01); *G06Q 20/325* (2013.01); *G06Q 20/353* (2013.01);
(Continued)

(58) Field of Classification Search
USPC ...... 705/35, 40, 39, 26, 38, 41, 37, 325, 67, 705/21, 75; 726/23, 25, 2; 455/410, 466,
(Continued)

(56) References Cited

U.S. PATENT DOCUMENTS 5,778,173 A * 7/1998 Apte .................. G06Q 20/02
705/75
7,096,003 B2  8/2006 Joao et al.
(Continued)

FOREIGN PATENT DOCUMENTS

CA    2 879 290 A1   1/2014
CA    2 903 983 A1   9/2014
(Continued)

OTHER PUBLICATIONS

Conkling, Craig. *NFC and the Mobile Payment Initiative-4*. Craig Conkling. Published Jan. 17, 2011. Retrieved on Jun. 6, 2014. Retrieved from the Internet: URL<http://craigconkling.blogspot.com/2011/01/nfc-and-mobile-payment-initiative-4.html>. 15 pages.
(Continued)

*Primary Examiner* — Tien Nguyen
(74) *Attorney, Agent, or Firm* — Lee & Hayes, PLLC

(57) ABSTRACT

Method, systems, and apparatus for processing a payment transaction includes determining that a network connection between a first destination in a payment system and a second destination in a payment system does not satisfy a latency threshold; receiving data indicating a payment transaction between a customer and a merchant; determining whether the payment transaction should be stored, where the determining is based on a risk algorithm model that considers risk factors associated with data regarding the payment transaction, risk factors associated with data regarding the customer, and risk factors associated with data regarding the merchant; if the payment transaction should be stored: storing the payment transaction for future processing; displaying an indication that the payment transaction has been successfully processed; if the payment transaction should not be stored: attempting to send a request for authorization
(Continued)

for the payment transaction at a payment service system included in the payment system.

42 Claims, 5 Drawing Sheets

(51) Int. Cl.
- *G06Q 20/34* (2012.01)
- *G06Q 20/40* (2012.01)
- *G07F 7/08* (2006.01)
- *G07F 7/12* (2006.01)

(52) U.S. Cl.
CPC ....... *G06Q 20/4016* (2013.01); *G07F 7/0886* (2013.01); *G07F 7/127* (2013.01)

(58) Field of Classification Search
USPC ...... 455/404.1, 407; 379/189; 709/217, 219, 709/223; 235/780, 379, 492, 383; 725/135; 340/5.9
See application file for complete search history.

(56) References Cited

U.S. PATENT DOCUMENTS

| | | | |
|---|---|---|---|
| 7,610,040 B2* | 10/2009 | Cantini | G06Q 20/04 340/5.9 |
| 8,041,338 B2* | 10/2011 | Chen | G06Q 20/108 455/407 |
| 8,224,709 B2* | 7/2012 | Hirson | G06Q 20/32 705/26.1 |
| 8,396,808 B2 | 3/2013 | Greenspan | |
| 8,660,911 B2* | 2/2014 | Hirson | G06Q 20/12 705/26.1 |
| 9,466,055 B2 | 10/2016 | Kulasooriya et al. | |
| 2001/0051920 A1 | 12/2001 | Joao et al. | |
| 2002/0016769 A1* | 2/2002 | Barbara | G06Q 20/04 705/40 |
| 2002/0194137 A1 | 12/2002 | Park et al. | |
| 2003/0046235 A1* | 3/2003 | Lacivita | G06Q 20/04 705/44 |
| 2003/0191709 A1 | 10/2003 | Elston et al. | |
| 2004/0088737 A1* | 5/2004 | Donlan | H04N 7/165 725/135 |
| 2004/0112959 A1 | 6/2004 | Jun | |
| 2004/0122685 A1* | 6/2004 | Bunce | G06Q 20/04 705/67 |
| 2004/0210519 A1 | 10/2004 | Oppenlander et al. | |
| 2005/0033688 A1 | 2/2005 | Peart et al. | |
| 2006/0123088 A1 | 6/2006 | Simmons et al. | |
| 2007/0051794 A1 | 3/2007 | Glanz et al. | |
| 2007/0194110 A1* | 8/2007 | Esplin | G06Q 20/20 235/383 |
| 2007/0194113 A1* | 8/2007 | Esplin | G06Q 20/10 235/383 |
| 2008/0097851 A1* | 4/2008 | Bemmel | G06Q 30/02 705/14.36 |
| 2008/0189186 A1 | 8/2008 | Choi et al. | |
| 2008/0208681 A1 | 8/2008 | Hammad et al. | |
| 2008/0223918 A1 | 9/2008 | Williams et al. | |
| 2008/0270302 A1 | 10/2008 | Beenau et al. | |
| 2009/0004998 A1* | 1/2009 | Aaron | H04M 3/5116 455/404.1 |
| 2009/0030885 A1 | 1/2009 | DePasquale et al. | |
| 2010/0057612 A1* | 3/2010 | Wagenhals | 705/40 |
| 2010/0114744 A1* | 5/2010 | Gonen | G06Q 40/00 705/35 |
| 2010/0169284 A1* | 7/2010 | Walter | G06F 11/1474 707/682 |
| 2010/0299220 A1* | 11/2010 | Baskerville | G06Q 20/32 705/26.35 |
| 2010/0312617 A1 | 12/2010 | Cowen | |
| 2010/0317318 A1 | 12/2010 | Carter et al. | |
| 2010/0318446 A1 | 12/2010 | Carter | |
| 2010/0332351 A1 | 12/2010 | Stone | |
| 2011/0016041 A1* | 1/2011 | Scragg | G06Q 20/4016 705/38 |
| 2011/0016054 A1 | 1/2011 | Dixon et al. | |
| 2011/0035294 A1 | 2/2011 | Mizrah | |
| 2011/0125566 A1 | 5/2011 | McLaughlin et al. | |
| 2011/0131122 A1* | 6/2011 | Griffin | G06Q 40/00 705/35 |
| 2011/0154497 A1* | 6/2011 | Bailey, Jr. | 726/25 |
| 2011/0196791 A1* | 8/2011 | Dominguez | G06Q 20/40 705/44 |
| 2011/0313925 A1* | 12/2011 | Bailey, Jr. | 705/44 |
| 2012/0036076 A1 | 2/2012 | Vanderwall et al. | |
| 2012/0084210 A1* | 4/2012 | Farahmand | 705/64 |
| 2012/0101822 A1 | 4/2012 | Dinerstein | |
| 2012/0109802 A1* | 5/2012 | Griffin | G06Q 40/00 705/35 |
| 2012/0144461 A1 | 6/2012 | Rathbun | |
| 2012/0233005 A1* | 9/2012 | White | 705/18 |
| 2012/0239556 A1 | 9/2012 | Magruder et al. | |
| 2012/0271765 A1* | 10/2012 | Cervenka | G06Q 20/12 705/44 |
| 2012/0284130 A1 | 11/2012 | Lewis et al. | |
| 2012/0310831 A1* | 12/2012 | Harris | G06Q 30/02 705/44 |
| 2013/0091042 A1 | 4/2013 | Shah et al. | |
| 2013/0151405 A1* | 6/2013 | Head | G06Q 20/36 705/41 |
| 2013/0179281 A1* | 7/2013 | White | G06Q 20/382 705/21 |
| 2013/0179352 A1* | 7/2013 | Dwyre | G06Q 20/20 705/71 |
| 2013/0185124 A1 | 7/2013 | Aaron et al. | |
| 2013/0185152 A1 | 7/2013 | Aaron et al. | |
| 2013/0346175 A1 | 12/2013 | Muthu | |
| 2014/0019340 A1 | 1/2014 | Ruder et al. | |
| 2014/0025958 A1* | 1/2014 | Calman | 713/189 |

FOREIGN PATENT DOCUMENTS

| | | |
|---|---|---|
| WO | 02/37219 A2 | 5/2002 |
| WO | 2012/037971 | 3/2012 |
| WO | 2014/014781 A1 | 1/2014 |
| WO | 2014/138109 A1 | 9/2014 |

OTHER PUBLICATIONS

Conkling, Craig. *General Credit Card (CC) Approval/Payment Process*. Craig Conkling. Figure 2. Published Jan. 17, 2011. Retrieved on Jun. 6, 2014. Retrieved from the Internet: URL<http://craigconkling.blogspot.com/2011/01/nfc-and-mobile-payment-initiative-4.html>. 1 page.

International Search Report and Written Opinion for International Patent Application No. PCT/US14/20389, file Mar. 4, 2014. Received Jun. 17, 2014. 17 pages.

"Offline DB Support for POS," Stack Overflow, dated Jan. 24, 2013, Retrieved from the Internet URL: <http://stackoverflow.com/questions/14495935/offline-dbsupport-for-pos>, on Jun. 4, 2014, p. 1-2.

"What is 'Offline Mode' and How Does It Work?," Vend, dated Dec. 20, 2011, Retrieved from the Internet URL: <http://support.vendhq.com/hc/enus/articles/201379940-What-is-Offline-Mode-and-how-does-it-work>, on Jun. 4, 2014, pp. 1-3.

"What is the Purpose of Retail Offline Sync Service and How Does It Work?," Microsoft Dynamics, dated Apr. 12, 2012, Retrieved from the Internet URL: <http://community.dynamics.com/ax/f/33/p/77 406/149851.aspx>, on Jun. 4, 2014, p. 1-3.

Denniswi, "How Can I change the Offline Mode Password in Microsoft Dynamice POS 2009?," Microsoft Dynamics, dated Nov. 8, 2011, Retrieved from the Internet URL: <https://community.dynamics.com/f/31/t/66698.aspx>, on Jun. 4, 2014, p. 1-1.

Perez, S., "Revel Systems Debuts An iPad Point-Of-Sale In A Box," TechCrunch, dated Jun. 1, 2012, Retrieved from the Internet URL: <http://techcrunch.com/2012/06/27/revel-systems-debuts-an-ipad-point-of-sale-in-a-box>, on Jun. 4, 2014, pp. 1-5.

(56) References Cited

OTHER PUBLICATIONS

Non-Final Office Action dated Feb. 18, 2015, in U.S. Appl. No. 13/797,390, of Ruder, E, et al., filed Mar. 12, 2013.
Final Office Action dated Aug. 12, 2015, in U.S. Appl. No. 13/797,390, of Ruder, E., et al., filed Mar. 12, 2013.
Office Action dated Nov. 9, 2015, in Canadian Patent Application No. 2,879,290 of Ruder, E., et al.
International Search Report and Written Opinion for PCT Application No. PCT/US2013/050345 dated Oct. 4, 2013.
Extended European Search Report for European Patent Application No. 13819366.9 dated Feb. 19, 2016.
Examination Report No. 1 for Australian Patent Application No. 2014225973, dated May 6, 2016.
Non-Final Office Action dated Jul. 28, 2016, in U.S. Appl. No. 13/797,390, of Ruder, E., et al., filed Mar. 12, 2013.
Extended European Search Report for European Patent Application No. 14760487.0 dated Jul. 7, 2016.
Examination Report for European Patent Application No. 13 819 366.9, dated Nov. 2, 2016.
Office Action for Canadian Patent Application No. 2,903,983, dated Nov. 4, 2016.
"MasterCard and VeriFone Bring 'Tap & Go' Payments to Taxis," Wireless News, Nov. 15, 2006, Retrieved from the Internet URL: http://search.proquest.com/printviewfile?accountid=14753, on Apr. 24, 2017, pp. 1-2.
"Suncorp and live TaxiEpay to provider Mobile Payment Terminals for Hypercom," Anonymous Wireless News, published Jun. 20, 2010, Retrieved from the Internet URL: http://search.proquest.com/printviewfile?accountid=14753, on Apr. 21, 2017, pp. 1-2.
Ferguson, R.B., "Passenger Hacks NYC computer system; The problem is more significant than GPS objections, according to the sofware engineer who hacked the system," eWeek, Dec. 28, 2007, Retrieved from the Internet URL: http://search.proquest.com/printviewfile?accountid=14753, on Apr. 24, 2017, pp. 1-2.
Examiner's Requisition for Canadian Patent Application No. 2,879,290, dated Jan. 11, 2017.
Notice of Acceptance for Australian Patent Application No. 2014225973, dated Mar. 15, 2017.
Final Office Action dated May 9, 2017, in U.S. Appl. No. 13/797,390, of Ruder, E., et al., filed Mar. 12, 2013.
Examination Report for European Patent Application No. 14760487.0, dated Jun. 28, 2017.
Third Party Observation submitted by examiner Richardson, M., for PCT Application No. PCT/US2013/050345 dated May 30, 2014.
Examiner's Requisition for Canadian Patent Application No. 2,903,983, dated Nov. 6, 2017.

* cited by examiner

PREDICTING APPROVAL OF TRANSACTIONS

TECHNICAL FIELD

This disclosure relates to mobile payment processing using a mobile device.

BACKGROUND

In a conventional point-of-sale electronic credit card transaction, the transaction is authorized and captured over a network connection. In the authorization stage, a physical credit card with a magnetic stripe is swiped through a merchant's magnetic card reader, e.g., as part of a point-of-sale device. A payment request is sent electronically from the magnetic card reader to a credit card processor. The credit card processor routes the payment request to a card network, e.g., Visa or Mastercard, which in turn routes the payment request to the card issuer, e.g., a bank. Assuming the card issuer approves the transaction, the approval is then routed back to the merchant. In the capture stage, the approved transaction is again routed from the merchant to the credit card processor, card network and card issuer, and the payment request can include the cardholder's signature (if appropriate). The capture stage can trigger the financial transaction between the card issuer and the merchant, and optionally creates a receipt. There can also be other entities, e.g., the card acquirer, in the route of the transaction. Debit card transactions have a different routing, but also require swiping of the card.

Occasionally, network problems, such as network unavailability or network latency, interfere with routing of the payment request from the card reader to the card issuer. Such network problems usually result in rejection of the transaction. The merchant is notified of the rejection and can try to process transactions later when the network problems are resolved.

SUMMARY

Point of sale devices, card processors, card issuers, and card networks may occasionally experience network problems and therefore may not be constantly available for payment processing. For example, a mobile device that is acting as a point of sale may enter an area with weak or no cellular data connection. If the point of sale device is experiencing network problems while conducting a transaction, the device can predict whether the transaction will be approved by the card issuer. As another example, when the credit card processor receives a payment request from a merchant but there is no network connection to the card network, the credit card processor can predict whether the transaction will be approved by the card issuer. In particular, the point of sale device or the credit card processor can execute a risk algorithm model to determine whether the transaction will eventually be approved. If the point of sale device determines the transaction will be approved, the point of sale device can store the transaction for future processing and approve the transaction without the card issuer's approval. By approving the transaction, the device can display, to a user of the device, that the transaction has been successfully processed. Otherwise, the point of sale device can attempt to process the transaction with the card processor under unsteady network conditions.

In one aspect, a method of processing a payment transaction includes determining that a network connection between a first destination in a payment system and a second destination in a payment system does not satisfy a latency threshold; receiving data indicating a payment transaction between a customer and a merchant; determining whether the payment transaction should be stored, where the determining is based on a risk algorithm model that considers risk factors associated with data regarding the payment transaction, risk factors associated with data regarding the customer, and risk factors associated with data regarding the merchant; if the payment transaction should be stored: storing the payment transaction for future processing; displaying, on the mobile device, an indication that the payment transaction has been successfully processed; if the payment transaction should not be stored: attempting to send a request for authorization for the payment transaction at a payment service system included in the payment system.

Implementations include one or more of the following features. The payment system includes one or more of the following destinations: the mobile device, a payment service system, a card issuer, or a bank. Determining whether the payment transaction should be stored, storing the payment transaction, and attempting to send the request for authorization occur on the mobile device. After storing the payment transaction, determining the network connection satisfies the latency threshold; determining the mobile device has one or more stored payment transactions; and forwarding each of the stored payment transactions to the payment service system. Determining whether the payment transaction should be stored, storing the payment transaction, and attempting to send the request for authorization occur at the payment service system. After storing the payment transaction, determining the network connection satisfies the latency threshold; determining the payment service system has one or more stored payment transactions; and forwarding each of the stored payment transactions to a card issuer. Calculating a random wait time, where the random wait time is within a range of an average round trip time for a successfully processed transaction; waiting the random wait time before displaying the indication. The risk factors associated with data regarding the payment transaction includes one or more of the following: a value of the payment transaction, description of the transaction, itemization of the transaction, a type of transaction input, a signature, or an image of the transaction. The risk factors associated with data regarding the customer includes one or more of the following: a number of already stored transactions, a total value, where the total value is a sum of the value of the payment transaction and values of one or more already stored transactions, prior transactions, a type of payment card, or customer account information, where the customer account information includes a name, contact information, or location of the customer. The risk factors associated with data regarding the merchant includes one or more of the following: a classification of the merchant, merchant transaction history, merchant account information, where the merchant account information includes age, name, or contact information of the merchant, merchant location, locations of transactions conducted with the merchant, operating system of merchant device, or a type of the merchant's financial account. The payment transaction is encrypted using a key before the storing, where the key is obtained from a payment service system. Determining whether the network connection satisfies the latency threshold after an interval of time. The network connection is a mobile data connection to the Internet. Data associated with each of the risk factors is updated at the mobile device by the payment service system when the network connection satisfies the latency threshold. Data associated with each of the risk factors is stored on the mobile device. The risk algorithm model is updated by the payment service system when the network connection satisfies the latency threshold.

Advantages may include one or more of the following. A customer can successfully conduct a point-of-sale electronic payment transaction with a merchant using a mobile device even if the mobile device experiences network difficulties when processing the electronic payment transaction. This allows the merchant to conduct more business with customers without worrying about maintaining a reliable Internet connection to a credit card processor.

In particular, a transaction can appear to be approved despite not having received approval from the card issuer. From a customer and a merchant's perspectives, the payment processor approved the transaction and both the customer and the merchant are unaffected by the network problems. Therefore, both experience a more satisfactory buying and selling experience, respectively. From a card processor perspective, declining a transaction that a card issuer would have approved is a lost opportunity to obtain revenue from the transaction. Thus, approving a transaction that the card issuer would have approved increases revenue.

BRIEF DESCRIPTION OF THE DRAWINGS

Like reference numbers and designations in the various drawings indicate like elements.

DETAILED DESCRIPTION

Figure 1:
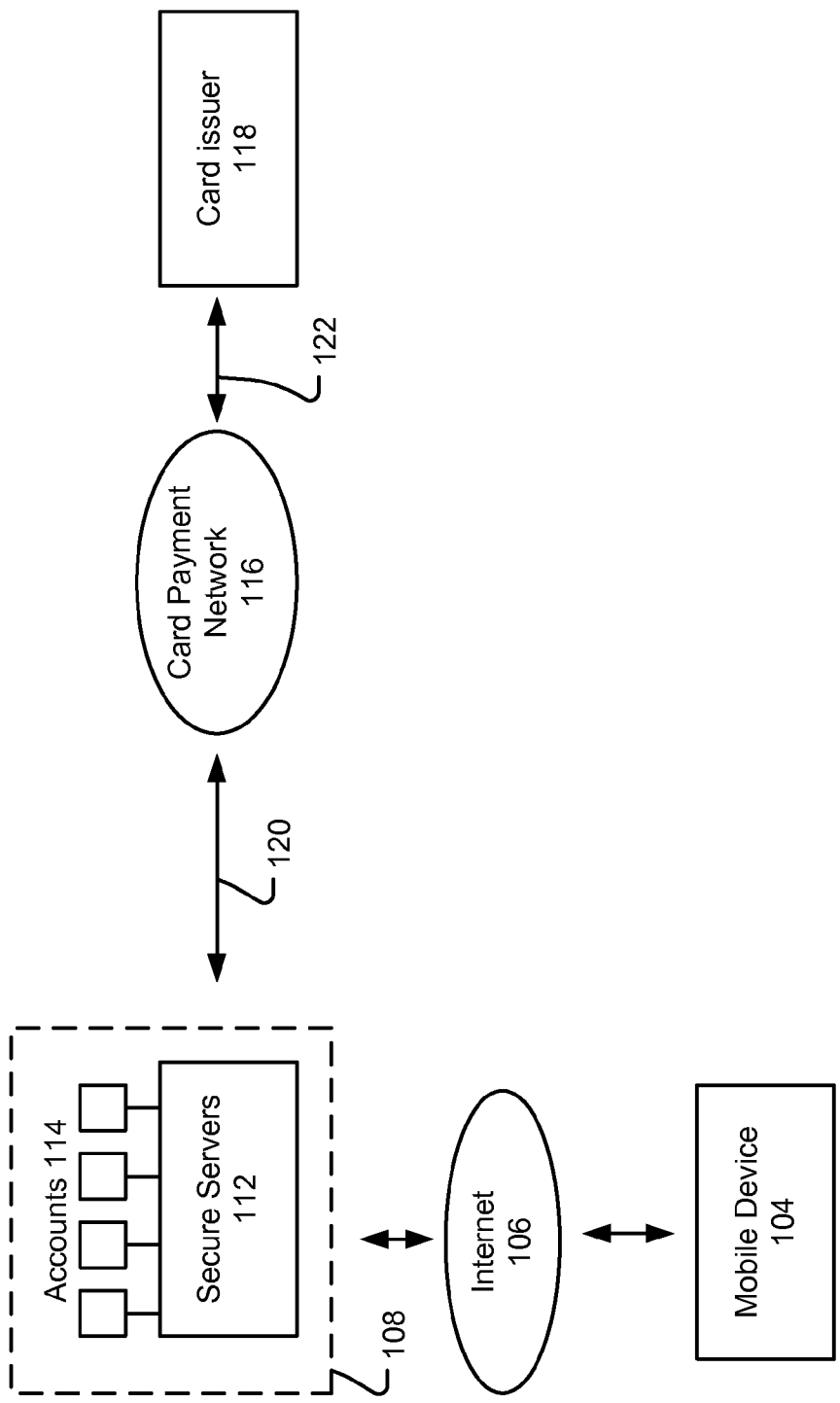
FIG. 1 is a schematic illustration of an example payment system architecture.

FIG. 1 is a schematic illustration of the architecture of an example payment system 100. The overall system 100 includes a mobile device 104, e.g., a merchant device, connected to a network, e.g., the Internet 106. The mobile device 104 is a mobile computing device, i.e., a hand-held computing device, capable of running a customer or a merchant application. For example, the mobile device 104 can be a smartphone, tablet, a desktop computer, a laptop computer, a dedicated point of sale system, or other data processing apparatus.

A payment processor operates a payment service system 108. The merchant device communicates with the payment service system 108 using the network 106. The payment service system 108 includes one or more servers 112, at least some of which can handle secure transactions (e.g., using a secure server), to processes all transactions with the mobile device 104. In general, servers 112 can store public merchant information such as the merchant's address or phone number. The servers 112 also handle secure information such as credit card numbers, debit card numbers, accounts 114, e.g., bank accounts and user accounts, user identifying information or other sensitive information.

The payment service system 108 can communicate with a computer system 116 of a card payment network, e.g., Visa or MasterCard. The payment service system 108 can communicate with a computer system 116 over the same network 106 used to communicate with the mobile device 104, or over a different network. The computer system 116 of the card payment network can communicate in turn with a computer system 118 of a card issuer, e.g., a bank. There can also be computer systems of other entities, e.g., the card acquirer, between the payment service system 108 and the card issuer.

Eventually, in order to receive funds from the transaction, the merchant will need to enter financial account information into the payment service system sufficient to receive funds. For example, in the case of a bank account, the merchant can enter the bank account number and routing number. The merchant's financial account can also be associated with a credit card account or another third party financial account. In addition, in some implementations, if the merchant has not entered the financial account information, the payment processor can hold the received funds until the financial account information is provided.

Occasionally, one or more networks in the payment processing chain experiences network problems. For example, one or more of the network connections 106, 120, or 122 can cause latency or may be unavailable, e.g., the network is down. If a network connection causes latency, approving a transaction can require a long processing time. If a network connection is unavailable, the transaction cannot be approved, e.g., by the payment service system 108 or the card issuer 118. Therefore, to increase a number of processed transactions, a mobile device can approve transactions based on a predicting whether transactions would have been approved if there were no network connection problems.

Figure 2:
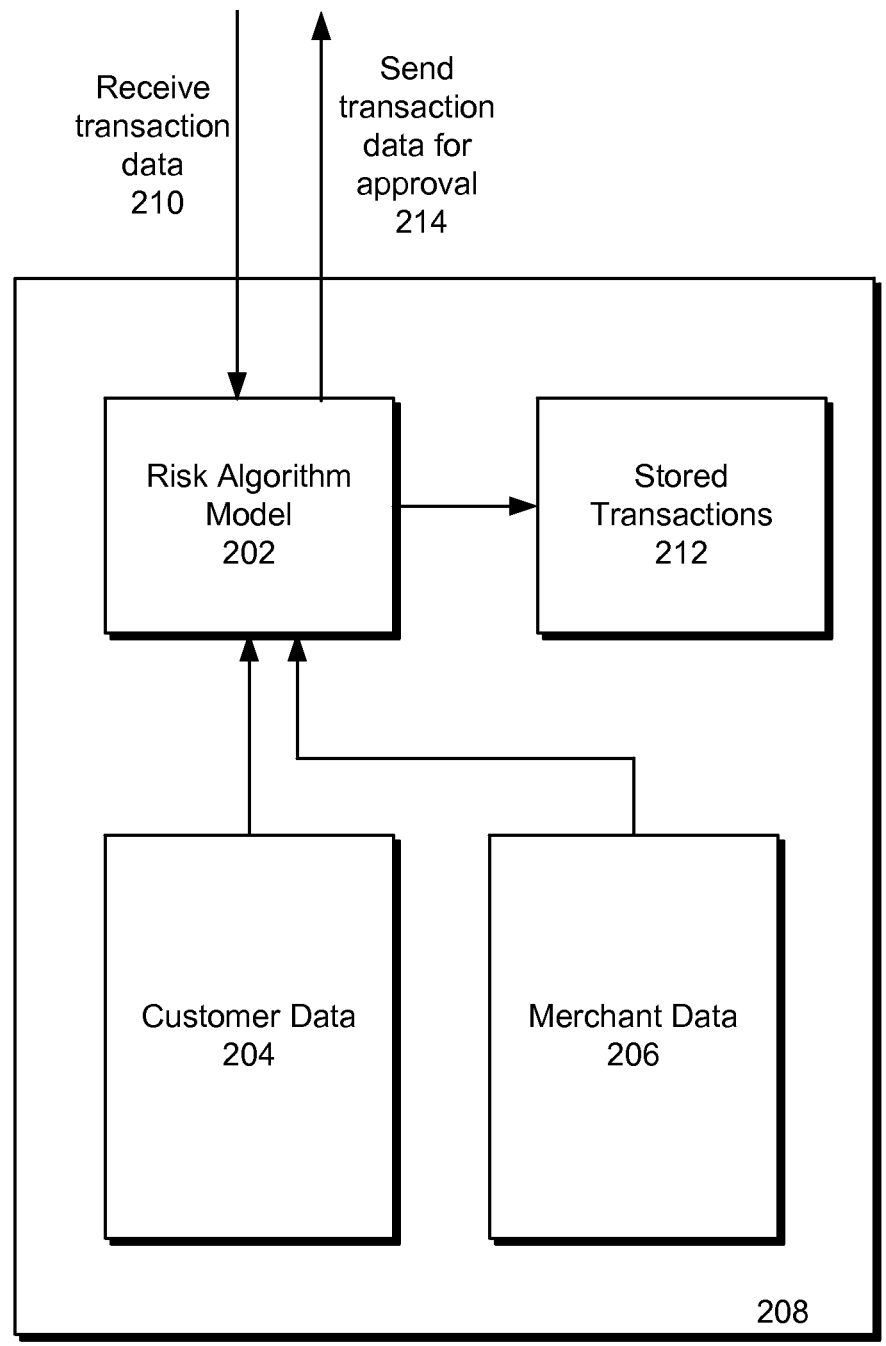
FIG. 2 is a schematic illustration of an example system for predicting approval for transactions on a mobile device.

FIG. 2 is a schematic illustration of an example system 200 for predicting approval for transactions on a mobile device 208. The mobile device 208, e.g., a merchant-facing device, can receive transaction data 210, e.g., from a user swiping a card at a card reader. For example, the card reader can be attached to the mobile device, e.g., through an audio jack, or can communicate wirelessly with the mobile device.

The transaction data 210 can include data stored on a magnetic stripe of a card, e.g., name, card number, expiration date, CVV1, or CVV2. The transaction data 210 can also include a merchant identifier, a transaction amount, a transaction environment, e.g., whether the card is swiped or a card number is keyed in, or a transaction date. In some implementations, the transaction data 210 includes other data provided by the mobile device 208. For example, the transaction data 210 can include a location, e.g., acquired through Global Positioning Satellite (GPS), an audio profile of background noise, e.g., from a microphone, a light level, e.g., from a camera, or accelerometer readings. The transaction data 210 can also include a signature or an accompanying image, e.g., a customer takes a picture of a purchased item.

The mobile device 208 can determine whether to store the transaction data 210 using a risk algorithm model 202, e.g., in stored transactions database 212. The risk algorithm model can consider customer data 204, merchant data 206, and transaction data 210 to make the determination. If the risk algorithm model predicts the transaction data 210 will eventually be approved, e.g., by a payment processor or card issuer, the mobile device 208 can store the transaction data 210, e.g., in a local database for future processing. If the risk algorithm model predicts the transaction data 210 will eventually be rejected, the mobile device can send the transaction data for approval 214 by the card processor or the card issuer. In some implementations, based on the risk algorithm model, the mobile device immediately rejects the transaction when the network connection is down. Specifics of the risk algorithm model will be described further below in reference to FIG. 3.

The customer data 204 and the merchant data 206 considered by the risk algorithm model 202 can be stored in local databases of the mobile device 208.

The customer data 204 is data related to the owner of the card used to conduct the transaction. The customer data 204 can include a purchase history of the customer's card, a type of card, e.g., credit, debit, prepaid, rewards, or gift, or information about the bank issuer, e.g., a bank identification number (BIN). For example, the purchase history can include a number of previous transactions conducted at different merchants. In particular, the purchase history can include a number of previous declines or chargebacks on the card. The purchase history can also include a number of previous transactions that occurred at merchants that do not have accounts with the payment service system.

The merchant data 206 includes data for multiple merchants having an account with the payment service system. The merchant data can include, for each merchant, a type of business, a merchant's previous history, information related to the merchant account, e.g., a name or contact information, a location of previous transactions, or a type of bank account used by the merchant, e.g., personal or business. The type of business can be a business category, e.g., a roofing business or a coffee shop. The previous history can include a number of card declines the merchant has, an average transaction size over time, or a number of chargebacks. The account information can include a name of the merchant. The merchant data can also include a platform used by the mobile device to process transactions, e.g., iOS or Android.

In some implementations, the mobile device 208 updates the customer and merchant data 204, 206 by receiving recent data from a payment processor, e.g., a payment service system 108 described above in reference to FIG. 1. For example, an application running on the mobile device 208 can request the customer and merchant data 204, 206 at regular intervals of time. The payment processor can also occasionally push newly updated customer and merchant data to the device. By storing the customer and merchant data locally, the mobile device can determine, without connecting to an external server, whether to approve a transaction using the risk algorithm model 202.

Figure 3:
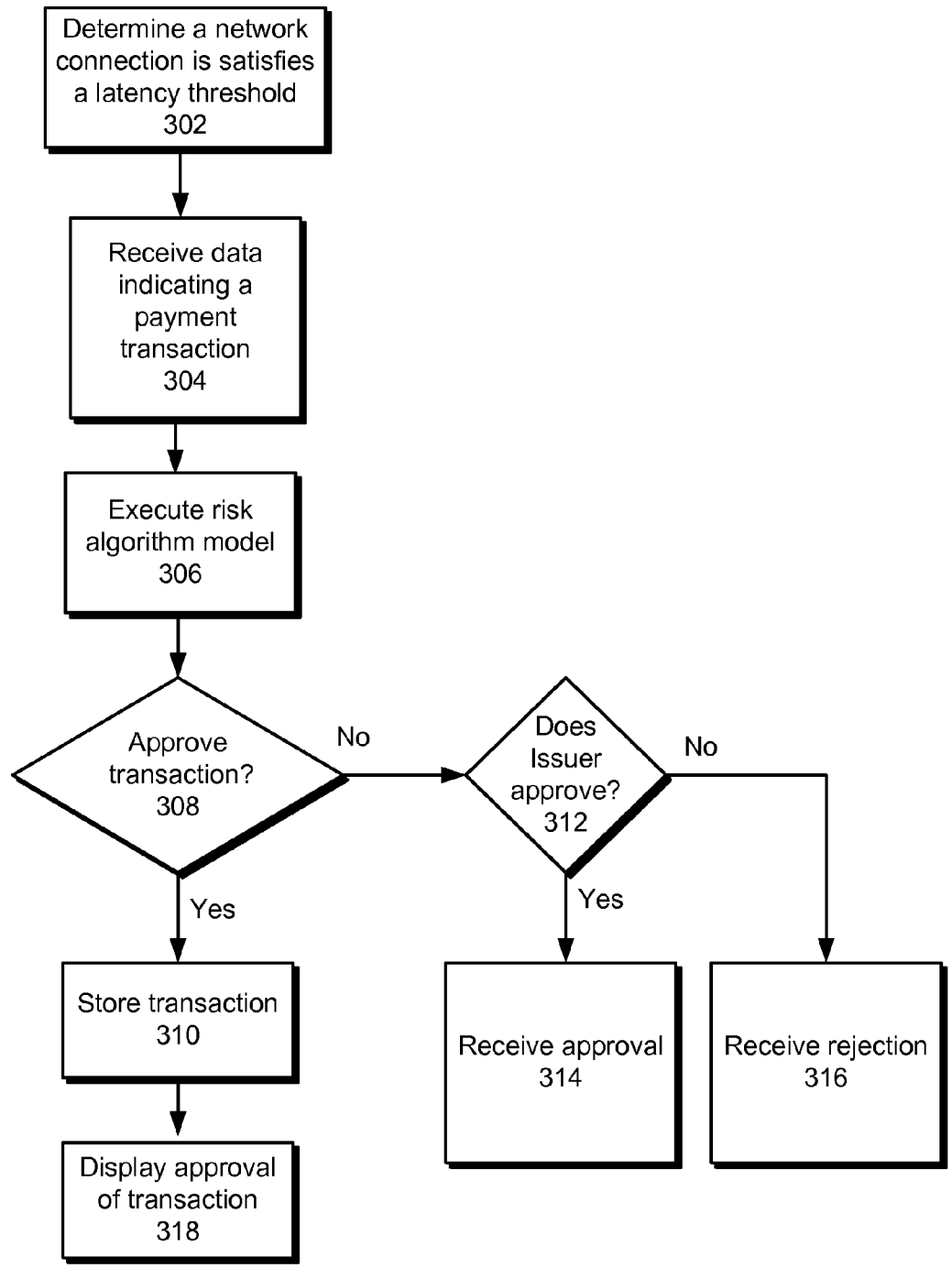
FIG. 3 is a flow chart of an example process of determining whether to store a payment transaction a payment transaction using an example risk algorithm model.

FIG. 3 is a flow chart of an example process 300 of determining whether to store a payment transaction using an example risk algorithm model. The mobile device, e.g., a merchant-facing device, determines that a connection to an external network, e.g., the Internet, does not satisfy a latency threshold (step 302). The latency threshold can be established at a level that allows a response to be received at the mobile device within a period of time, e.g., ten seconds. The connection also does not satisfy the latency threshold if it is unavailable, e.g., the device cannot establish any connection. These connections occur because there may be weak cellular Internet connection in areas with poor cellular data reception or with too many cellular data connections concentrated in one area. To determine whether a connection satisfies the latency threshold, the mobile device can test a speed of a connection to a resource, e.g., a web page, located on the external network. For example, the connection does not satisfy the latency threshold if a ping response time is higher than an established threshold. In some implementations, a payment service system notifies the mobile device that the connection does not satisfy the latency threshold, e.g., because a network between the payment service system and a card issuer is unavailable.

The mobile device receives data indicating a payment transaction (step 304). For example, a merchant facing device can receive the data from a card reader attached to the mobile device, and the card reader receives data from a user swiping a card at the card reader. The data can include payment information, a signature, a tip amount, or a total transaction amount as described above in reference to FIG. 2.

The mobile device can execute a risk algorithm model to determine whether the transaction will eventually be approved (step 306). As described above, the risk algorithm model can consider transaction data, merchant data, and customer data. In some implementations, the risk algorithm model uses a classifier to process each attribute, e.g., a number of previous transactions, of each type of data to determine whether the transaction will eventually be approved. That is, the classifier can be trained, e.g., using previously approved or rejected transactions, before being used to classify each transaction as "will be approved" or "will not be approved." In some other implementations, each attribute of each type of data can be normalized and weighted by a predetermined weight. The risk algorithm model can aggregate each weighted normalization, and if the sum satisfies a predetermined threshold, the risk algorithm model can determine the transaction will eventually be approved.

Some attributes are considered more important than others by the risk algorithm model. For example, customer data such as a BIN and a purchase history can be more highly weighted than other customer data. If a customer account has a BIN that has been previously tagged as fraudulent, the risk algorithm model can determine not to store the transaction. On the other hand, a customer that has frequently purchased items or services at the merchant can be a heavy weight in determining the transaction will eventually be approved and therefore should be stored.

With merchant data, the risk algorithm model can weigh a type of business as important. Some types of businesses are riskier than others. For example, a construction business with traditionally high transaction amounts is more risky to the algorithm model than a coffee shop with low transaction amounts. The risk algorithm model can also give a weight to a name of the merchant. For example, the risk algorithm model can weigh a merchant's name that has special words or symbols to be a strong factor in determining the transaction will not eventually be approved. The risk algorithm model can weigh an area code that has recently had a high traffic of fraudulent activity to be a weak factor in determining the transaction will not eventually be approved. Also, the risk algorithm model compares a location of the conducted transaction to the type of business. If the type of business is immobile, e.g., a brick and mortar coffee shop, the risk algorithm model can determine a transaction occurring at a location other than a primary place of business will not eventually be approved. The risk algorithm model can also weigh a type of operating system used by the mobile device, e.g., iOS or Android, or a type of bank account, e.g., personal or business, as small factors in the determination.

With transaction data, the risk algorithm model can weigh a value of the proposed stored transaction, a transaction environment, and existence of a signature more than other attributes. For example, if the value of the proposed transaction is one or more standard deviations higher than an average value of transactions conducted at the merchant, the risk algorithm model can determine the transaction will not eventually be approved. Also, the risk algorithm model can determine an environment in which a card number is keyed in (instead of swiped) is a small factor that the transaction will not eventually be approved.

The mobile device determines whether to store the transaction based on the risk algorithm model's determination (step 308). If the risk algorithm model determines the transaction will eventually be approved, the mobile device stores the transaction (step 310). Otherwise, the mobile device can attempt to send, under unstable network conditions, a request to process the transaction to a card issuer for approval. If the request is received by the card issuer, the card issuer can approve the transaction (step 312) and send a response to the mobile device. The response can be an approval (step 314) or a rejection (step 316) of the transaction. If the request is not received, the mobile device can display a rejection on a display of the mobile device. For example, the mobile device can display, to a customer or a merchant, a message of an inability to connect to a payment service system.

If the mobile device decides to store the transaction data, the payment service system assumes the risk that the transaction will not be approved, e.g., by a card issuer, in the future. In particular, the payment service system can pay the merchant for the amount of the stored transaction. If the transaction is eventually approved, then the payment service system will be reimbursed by the card issuer. However, if the transaction is eventually declined, the payment service system will need to cover, i.e., pay for, the transaction.

In some implementations, the mobile device encrypts the transaction, e.g., using a key or a signature on the mobile device, before storing the transaction. The key can be obtained from the payment service system. The key can also be short lived and discarded after a single use. For example, after the mobile device uploads a collection of stored transactions, the payment service system can provide the mobile device with a new key.

After storing a transaction, the mobile device can display an indication that the transaction was successfully processed (step 318). For example, after storing the transaction, the mobile device can display a user interface that is normally shown when receiving a notification that a card issuer successfully processed a transaction. In some implementations, the mobile device waits a random amount of time before displaying the indication. In particular, the random amount of time can be selected from a range of frequent response times from a card issuer under normal network conditions. By waiting the random amount of time, the payment service system achieves an increased level of security because a user of the mobile device will be unable to ascertain whether the transaction is being stored or being processed by the card issuer.

Figure 4:
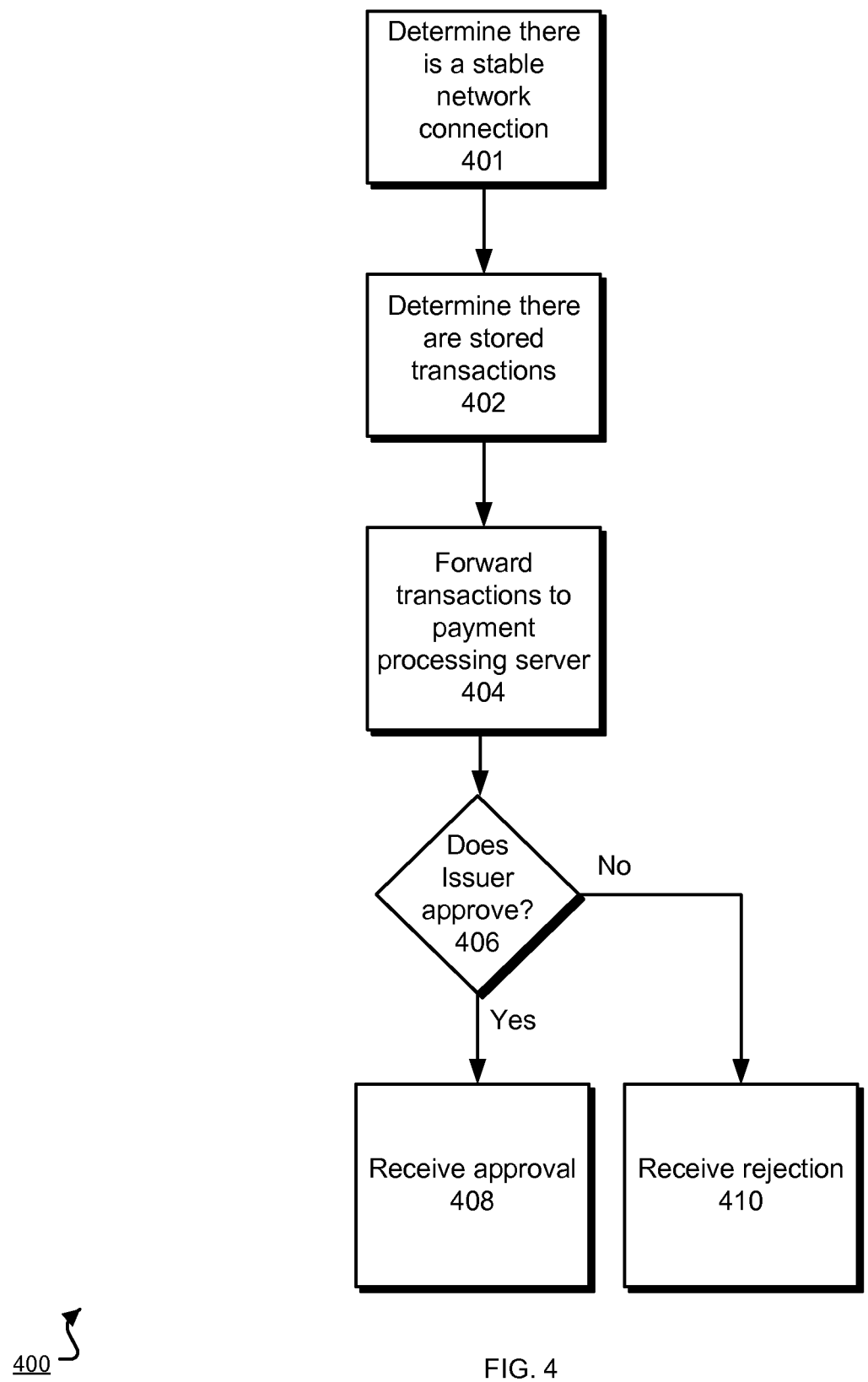
FIG. 4 is a flow chart of an example process of forwarding a payment transaction.

FIG. 4 is a flow chart of an example process 400 of forwarding a payment transaction. The mobile device, e.g., a merchant device, can periodically determine whether the mobile device has a strong connection, e.g., there is no latency, to an external network, e.g., the Internet. This determination can occur during, before, or after a transaction. For example, the mobile device can ping a resource every few minutes or through an exponential backoff algorithm to determine latency and availability of the network. If the mobile device eventually determines it has a strong connection to the Internet (step 401), the mobile device determines whether there are stored transactions on the mobile device (step 402), e.g., by accessing a database of stored transactions. If there are stored transactions that have not yet been forwarded, the mobile device forwards each transaction to a payment service system for processing (step 404), e.g., using the reestablished Internet connection. In some implementations, the stored transactions are batched and sent to the payment service system for processing.

The payment service system can send each stored transaction to a card issuer for approval (step 406). The card issuer can determine whether to approve or deny each stored transaction and send each determination to the payment service system, which can forward the determination to the mobile device. The mobile device can receive either an approval (step 408) or a rejection (step 410) for each stored transaction. The mobile device can also receive receipts for each stored transaction. In some implementations, upon receiving a receipt, the mobile device removes the respective transaction from the database of stored transactions.

In some implementations, the transactions are stored at the payment service system instead of the mobile device. For example, the mobile device can have a strong connection to the payment service system, but the payment service system can experience network problems with a card issuer or a bank. In this case, the mobile device can send transaction data to the payment service system, and the payment service system can determine, using a risk algorithm model at the payment service system, whether to store and forward the transaction. The transaction can be stored and forwarded as described above in reference to FIGS. 3-4.

Figure 5:
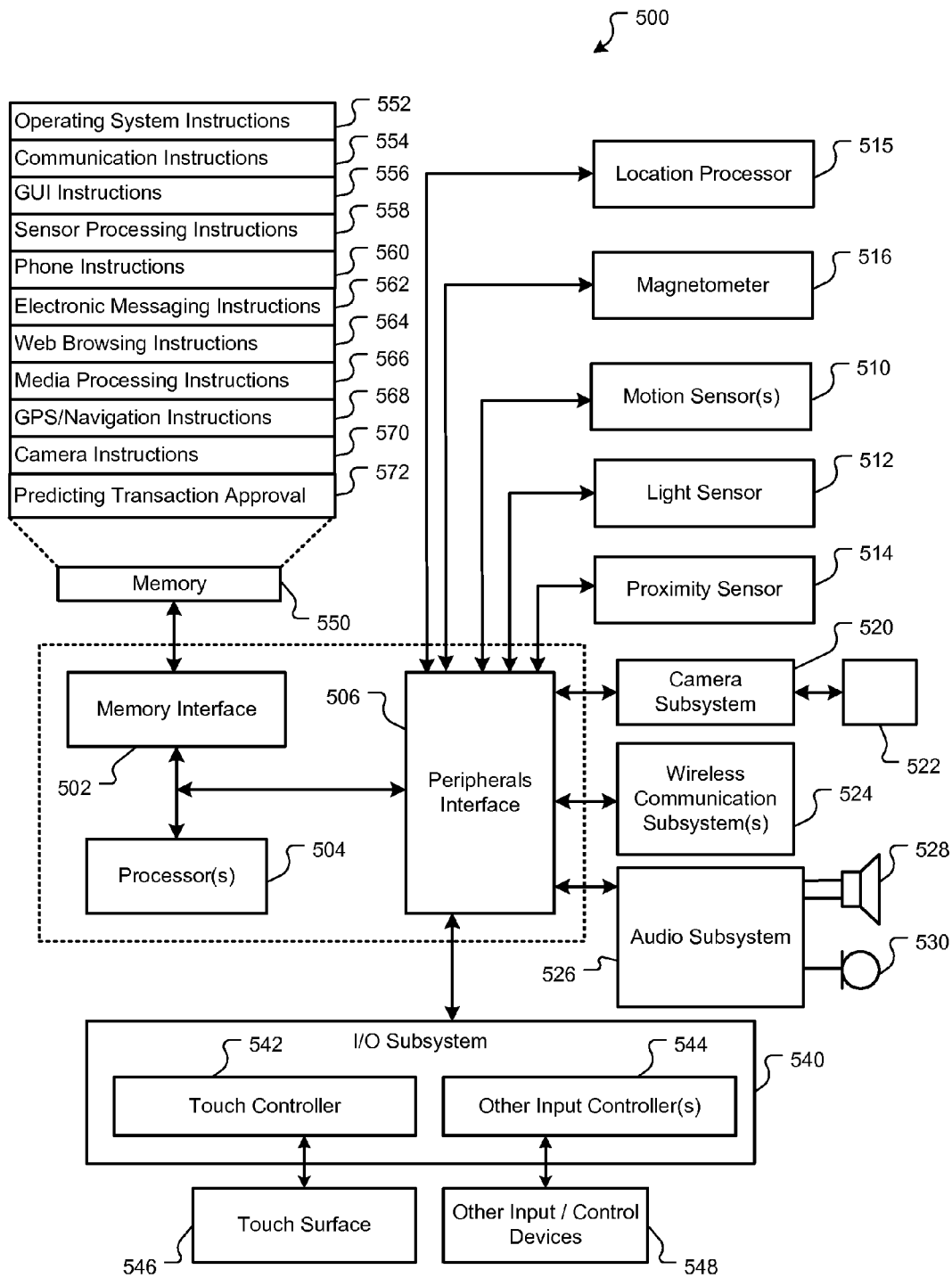
FIG. 5 is a block diagram of an exemplary architecture of a mobile device capable of predicting approval of transactions.

FIG. 5 is a block diagram of an exemplary architecture of a mobile device capable of predicting approval of transactions. Architecture 500 can be implemented in any device for generating the features described in reference to FIGS. 1-4, including but not limited to portable or desktop computers, smart phones and electronic tablets, television systems, game consoles, kiosks and the like. Architecture 500 can include memory interface 502, data processor(s), image processor(s) or central processing unit(s) 504, and peripherals interface 506. Memory interface 502, processor(s) 504 or peripherals interface 506 can be separate components or can be integrated in one or more integrated circuits. The various components can be coupled by one or more communication buses or signal lines.

Sensors, devices, and subsystems can be coupled to peripherals interface 506 to facilitate multiple functionalities. For example, motion sensor 510, light sensor 512, and proximity sensor 514 can be coupled to peripherals interface 506 to facilitate orientation, lighting, and proximity functions of the device. For example, in some implementations, light sensor 512 can be utilized to facilitate adjusting the brightness of touch surface 546. In some implementations, motion sensor 510 (e.g., an accelerometer, gyros) can be utilized to detect movement and orientation of the device. Accordingly, display objects or media can be presented according to a detected orientation (e.g., portrait or landscape).

Other sensors can also be connected to peripherals interface 506, such as a temperature sensor, a biometric sensor, or other sensing device, to facilitate related functionalities.

Location processor 515 (e.g., GPS receiver) can be connected to peripherals interface 506 to provide geo-positioning. Electronic magnetometer 516 (e.g., an integrated circuit chip) can also be connected to peripherals interface 506 to provide data that can be used to determine the direction of magnetic North. Thus, electronic magnetometer 516 can be used as an electronic compass.

Camera subsystem 520 and an optical sensor 522, e.g., a charged coupled device (CCD) or a complementary metaloxide semiconductor (CMOS) optical sensor, can be utilized to facilitate camera functions, such as recording photographs and video clips.

Communication functions can be facilitated through one or more communication subsystems 524. Communication subsystem(s) 524 can include one or more wireless communication subsystems. Wireless communication subsystems 524 can include radio frequency receivers and transmitters and/or optical (e.g., infrared) receivers and transmitters. Wired communication system can include a port device, e.g., a Universal Serial Bus (USB) port or some other wired port connection that can be used to establish a wired connection to other computing devices, such as other communication devices, network access devices, a personal computer, a printer, a display screen, or other processing devices capable of receiving or transmitting data. The specific design and implementation of the communication subsystem 524 can depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, 802.x communication networks (e.g., WiFi, WiMax, or 3G networks), code division multiple access (CDMA) networks, and a Bluetooth™ network. Communication subsystems 524 may include hosting protocols such that the device may be configured as a base station for other wireless devices. As another example, the communication subsystems can allow the device to synchronize with a host device using one or more protocols, such as, for example, the TCP/IP protocol, HTTP protocol, UDP protocol, and any other known protocol.

Audio subsystem 526 can be coupled to a speaker 528 and one or more microphones 530 to facilitate voice-enabled functions, such as voice recognition, voice replication, digital recording, and telephony functions.

I/O subsystem 540 can include touch controller 542 and/or other input controller(s) 544. Touch controller 542 can be coupled to a touch surface 546. Touch surface 546 and touch controller 542 can, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with touch surface 546. In one implementation, touch surface 546 can display virtual or soft buttons and a virtual keyboard, which can be used as an input/output device by the user.

Other input controller(s) 544 can be coupled to other input/control devices 548, such as one or more buttons, rocker switches, thumb-wheel, infrared port, USB port, and/or a pointer device such as a stylus. The one or more buttons (not shown) can include an up/down button for volume control of speaker 528 and/or microphone 530.

In some implementations, device 500 can present recorded audio and/or video files, such as MP3, AAC, and MPEG files. In some implementations, device 500 can include the functionality of an MP3 player and may include a pin connector for tethering to other devices. Other input/output and control devices can be used.

Memory interface 502 can be coupled to memory 550. Memory 550 can include high-speed random access memory or non-volatile memory, such as one or more magnetic disk storage devices, one or more optical storage devices, or flash memory (e.g., NAND, NOR). Memory 550 can store operating system 552, such as Darwin, RTXC, LINUX, UNIX, OS X, WINDOWS, or an embedded operating system such as VxWorks. Operating system 552 may include instructions for handling basic system services and for performing hardware dependent tasks. In some implementations, operating system 552 can include a kernel (e.g., UNIX kernel).

Memory 550 may also store communication instructions 554 to facilitate communicating with one or more additional devices, one or more computers or servers. Communication instructions 554 can also be used to select an operational mode or communication medium for use by the device, based on a geographic location (obtained by the GPS/Navigation instructions 568) of the device. Memory 550 may include graphical user interface instructions 556 to facilitate graphic user interface processing; sensor processing instructions 558 to facilitate sensor-related processing and functions; phone instructions 560 to facilitate phone-related processes and functions; electronic messaging instructions 562 to facilitate electronic-messaging related processes and functions; web browsing instructions 564 to facilitate web browsing-related processes and functions and display GUIs; media processing instructions 566 to facilitate media processing-related processes and functions; GPS/Navigation instructions 568 to facilitate GPS and navigation-related processes; camera instructions 570 to facilitate camera-related processes and functions; and instructions 572 for predicting approval of transactions. The memory 550 may also store other software instructions for facilitating other processes, features and applications, such as applications related to navigation, social networking, location-based services or map displays.

Each of the above identified instructions and applications can correspond to a set of instructions for performing one or more functions described above. These instructions need not be implemented as separate software programs, procedures, or modules. Memory 550 can include additional instructions or fewer instructions. Furthermore, various functions of the mobile device may be implemented in hardware and/or in software, including in one or more signal processing and/or application specific integrated circuits.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a non-transitory computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Thus, particular embodiments of the subject matter have been described. Other embodiments are within the scope of the following claims. For example, predicting approval of transactions may not be limited to being implemented on a mobile device but could also be applied to other environments, such as a payment service system. Usage of the techniques to predict approval could also be applied to non-mobile or wired devices connected to a network. Although the swiping of a card through a reader is described above, other techniques for scanning a card, e.g., chip reading or near field communication, could be used to read data from the card.

What is claimed is:

1. A method of processing a payment transaction, the method comprising:
   receiving, by one or more applications operating on a merchant point-of-sale (POS) terminal associated with a merchant, an indication to process a payment transaction between the merchant and a customer at the merchant POS terminal;
   receiving, by the one or more applications operating on the merchant POS terminal and from a card reader, payment information for a payment card that is to be used to process the payment transaction between the merchant and the customer;
   determining, at a first time, that a first network connection between the merchant POS terminal and a computing device of a payment service is offline;
   subsequent to determining at the first time that the first network connection between the merchant POS terminal and the computing device of the payment service is offline:
   performing, by the one or more applications operating on the merchant POS terminal, a risk analysis to determine a likelihood that the payment transaction will be approved at a second time when the first network connection is online, wherein the risk analysis is based at least in part on a risk algorithm model that considers one or more of: (i) one or more risk factors associated with data regarding the payment transaction, (ii) one or more risk factors associated with data regarding the customer, or (iii) one or more risk factors associated with data regarding the merchant, and wherein the risk algorithm model determines a weight for individual ones of the one or more risk factors, weights the one or more risk factors, and calculates a sum of the one or more weighted risk factors;
   when the sum of the one or more weighted risk factors is less than a threshold value displaying, on the merchant POS terminal, a rejection of the payment transaction such that the payment information is not saved for future processing;
   when the sum of the one or more weighted risk factors is greater than the threshold value:
      determining that the payment transaction will likely be approved at the second time when the first network connection of the merchant POS terminal is online;
      storing, at the merchant POS terminal, the payment information for future processing of the payment transaction; and
      displaying, on the merchant POS terminal, an indication that the merchant should provide an item or service to the customer for the payment transaction;
   after storing the payment information, determining that the first network connection between the merchant POS terminal and the computing device of the payment service is online;
   subsequent to determining that the first network connection of the merchant POS terminal is online, sending the payment information to the computing device of the payment service to process the payment transaction;
   receiving, at the computing device of the payment service and from the merchant POS terminal, the payment information to process the payment transaction;
   determining that a second network connection between the payment service and another computing device of a payment processing system is offline;
   based at least in part on determining that the second network connection to the other computing device of the payment processing system is offline, storing the payment information at the computing device of the payment service for future processing of the payment transaction;
   determining that the second network connection to the other computing device of the payment processing system is online; and
   based at least in part on determining that the second network connection to the other computing device of the payment processing system is online, sending the payment information to the other computing device associated with the payment processing system for processing of the payment transaction.

2. The method of claim 1, further comprising:
   determining the merchant POS terminal has one or more stored payment transactions; and
   forwarding each of the stored payment transactions to the payment service.

3. The method of claim 1, further comprising:
   calculating a wait time, where the wait time is within a range of an average round trip time for a successfully processed transaction; and
   waiting the wait time before causing display of the indication.

4. The method of claim 1, wherein:
   the data regarding the payment transaction include one or more of the following: a value of the payment transaction, description of the payment transaction, itemization of the payment transaction, a type of transaction input, a signature, or an image of the payment transaction.

5. The method of claim 1, wherein:
the data regarding the customer include one or more of the following: a number of already stored transactions, a total value, where the total value is a sum of the value of the payment transaction and values of one or more already stored transactions, prior transactions, a type of payment card, or customer account information, where the customer account information includes a name, contact information, or location of the customer.

6. The method of claim 1, wherein:
the data regarding the merchant includes one or more of the following: a classification of the merchant, merchant transaction history, merchant account information, where the merchant account information includes age, name, or contact information of the merchant, merchant location, locations of transactions conducted with the merchant, operating system of merchant device, or a type of a financial account of the merchant.

7. The method of claim 1, wherein the payment information is encrypted using a key before the storing, where the key is obtained from the payment service.

8. The method of claim 1, wherein determining that the first network connection of the merchant POS terminal is online occurs after an interval of time.

9. The method of claim 1, wherein the first network connection is a cellular data connection to an Internet.

10. The method of claim 1, further comprising:
updating data associated with at least one of (i) the one or more risk factors associated with data regarding the payment transaction, (ii) the one or more risk factors associated with data regarding the customer, or (iii) the one or more risk factors associated with data regarding the merchant after determining that the network connection of the merchant POS terminal is online.

11. The method of claim 1, wherein:
data associated with at least one of (i) the one or more risk factors associated with data regarding the payment transaction, (ii) the one or more risk factors associated with data regarding the customer, or (iii) the one or more risk factors associated with data regarding the merchant is stored on the merchant POS terminal.

12. The method of claim 1, further comprising:
updating the risk algorithm model after determining that the first network connection of the merchant POS terminal is online.

13. A system for processing a payment transaction, the system comprising:
one or more applications executing on a merchant point-of-sale (POS) device associated with a merchant;
a card reader;
a first processor; and
first computer-readable media coupled to the processor and having first instructions stored thereon, which, when executed by the processor, cause the processor to perform operations comprising:
receiving, by the one or more applications executing on the merchant POS device and via the card reader, payment information for a payment card that is to be used to process a payment transaction between the merchant and a customer;
determining, at a first time, that a first network connection to a network-based computing device in a payment system is offline;
subsequent to determining, at the first time, that the first network connection to the network-based computing device is offline:
performing a risk analysis to determine a likelihood that the payment transaction will be approved at a second time when the first network connection to the network-based computing device in the payment system is online, wherein the risk analysis is based at least in part on a risk algorithm model that considers one or more of: (i) one or more risk factors associated with data regarding the payment transaction, (ii) one or more risk factors associated with data regarding the customer, or (iii) one or more risk factors associated with data regarding the merchant, and wherein the risk algorithm model determines a weight for individual ones of the one or more risk factors, weights the one or more risk factors, and calculates a sum of the one or more weighted risk factors;
when the sum of the one or more weighted risk factors is less than a threshold value, displaying, on the merchant POS device, a rejection of the payment transaction such that the payment information is not saved for future processing;
when the sum of the one or more weighted risk factors is greater than the threshold value:
determining that the payment transaction will likely be approved at the second time when the first network connection of the merchant POS device is online;
storing, by the one or more applications and at the merchant POS device, the payment information for future processing of the payment transaction; and
displaying, on the merchant POS device, an indication that the merchant should provide an item or service to the customer for the payment transaction;
after storing the payment information, determining that the first network connection to the network-based computing device in the payment system is online; and
subsequent to determining that the first network connection to the network-based computing device in the payment system is online, sending the payment information to the network-based computing device to process the payment transaction; and
the network-based computing device in the payment system comprising:
a second processor; and
second computer-readable media coupled to the second processor and having second instructions stored thereon, which, when executed by the second processor, cause the second processor to perform acts comprising:
receiving, from the merchant POS device, the payment information to process the payment transaction;
determining that a second network connection to a computing device of a payment processing system is offline;
based at least in part on determining that the second network connection to the computing device of the payment processing system is offline, storing the payment information for future processing of the payment transaction;

determining that the second network connection to the computing device of the payment processing system is online; and based at least in part on determining that the second network connection to the computing device of the payment processing system is online, sending the payment information to the computing device of the payment processing system for processing of the payment transaction.

14. The system of claim 13, wherein performing the risk analysis to determine the likelihood that the payment transaction will be approved at the second time, storing the payment information, and sending the payment information are performed on the merchant POS device.

15. The system of claim 14, wherein the operations further comprise:
determining the merchant POS device has one or more stored payment transactions; and
forwarding each of the stored payment transactions to the payment system.

16. The system of claim 13, wherein the acts further comprise performing another risk analysis to determine a likelihood that the payment transaction will be approved in the future.

17. The system of claim 16, wherein the operations further comprise:
determining the payment system has one or more stored payment transactions; and
forwarding each of the stored payment transactions to the payment processing system.

18. The system of claim 13, where the operations further comprise:
calculating a wait time, where the wait time is within a range of an average round trip time for a successfully processed transaction; and
waiting the wait time before causing display of the indication.

19. The system of claim 13, wherein the data regarding the payment transaction includes one or more of the following: a value of the payment transaction, description of the payment transaction, itemization of the payment transaction, a type of transaction input, a signature, or an image of the payment transaction.

20. The system of claim 13, wherein the data regarding the customer includes one or more of the following: a number of already stored transactions, a total value, where the total value is a sum of the value of the payment transaction and values of one or more already stored transactions, prior transactions, a type of payment card, or customer account information, where the customer account information includes a name, contact information, or location of the customer.

21. The system of claim 13, wherein the data regarding the merchant includes one or more of the following: a classification of the merchant, merchant transaction history, merchant account information, where the merchant account information includes age, name, or contact information of the merchant, merchant location, locations of transactions conducted with the merchant, operating system of merchant device, or a type of a financial account of the merchant.

22. The system of claim 13, wherein the payment information is encrypted using a key before the storing, where the key is obtained from the payment system.

23. The system of claim 13, wherein determining that the first network connection to the network-based computing device in the payment system is online occurs after an interval of time.

24. The system of claim 13, wherein the first network connection is a cellular data connection to an Internet.

25. The system of claim 13,
wherein the operations further comprise:
updating data at the merchant POS device associated with at least one of (i) the one or more risk factors associated with data regarding the payment transaction, (ii) the one or more risk factors associated with data regarding the customer, or (iii) the one or more risk factors associated with data regarding the merchant after determining that the first network connection to the network-based computing device in the payment system is online.

26. The system of claim 13,
wherein data associated with at least one of (i) the one or more risk factors associated with data regarding the payment transaction, (ii) the one or more risk factors associated with data regarding the customer, or (iii) the one or more risk factors associated with data regarding the merchant is stored on the merchant POS device.

27. The system of claim 13, wherein the operations further comprise:
updating the risk algorithm model used to perform the risk analysis after determining that the first network connection to the network-based computing device in the payment system is online.

28. A system for processing a payment transaction, the system comprising:
one or more applications executing on a merchant point-of-sale (POS) device associated with a merchant;
a card reader;
a first processor; and
first non-transitory computer-readable media having instructions stored thereon which, when executed by the first processor, cause the first processor to perform operations comprising:
receiving, by the one or more applications executing on the merchant POS device and via the card reader, payment information for a payment card that is to be used to process a payment transaction between a merchant and a customer;
determining, at a first time, that a first network connection between the merchant POS device and a computing device in a payment system is offline;
subsequent to determining, at the first time, that the first network connection to the computing device in the payment system is offline:
performing a risk analysis to determine a likelihood that the payment transaction will be approved at a second time when the first network connection to the computing device in the payment system is online, wherein the risk analysis is based at least in part on a risk algorithm model that considers one or more of: (i) one or more risk factors associated with data regarding the payment transaction, (ii) one or more risk factors associated with data regarding the customer, or (iii) one or more risk factors associated with data regarding the merchant, and wherein the risk algorithm model determines a weight for individual ones of the one or more risk factors, weights the one or more risk factors, and calculates a sum of the one or more weighted risk factors;
when the sum of the one or more weighted risk factors is less than a threshold value, displaying, on the merchant POS device, a rejection of the payment transaction such that the payment information is not saved for future processing;

when the sum of the one or more weighted risk factors is greater than the threshold value:
    determining that the payment transaction will likely be approved at the second time when the first network connection of the merchant POS device is online;
    storing, at the merchant POS device, the payment information for future processing of the payment transaction; and
    displaying, on the merchant POS device, an indication that the merchant should provide an item or service to the customer for the payment transaction;
after storing the payment information, determining that the first network connection to the computing device in the payment system is online; and
based at least in part on determining that the first network connection to the computing device in the payment system is online, sending the payment information, from the merchant POS device, to the payment system to process the payment transaction; and
the payment system, comprising:
a second processor; and
second non-transitory computer-readable media having instructions stored thereon, which, when executed by the second processor, cause the second processor to perform acts comprising:
    receiving, from the merchant POS device, the payment information to process the payment transaction;
    determining that a second network connection to another computing device of a payment processing system is offline;
    based at least in part on determining that the second network connection to the other computing device of the payment processing system is offline, storing the payment information for future processing of the payment transaction;
    determining that the second network connection to the other computing device of the payment processing system is online; and
    based at least in part on determining that the second network connection to the other computing device of the payment processing system is online, sending the payment information to the other computing device of the payment processing system for processing of the payment transaction.

29. The system of claim 28, wherein the one or more applications executing on the merchant POS device perform the risk analysis to determine a likelihood that the payment transaction will be approved in the future, storing the payment information, and sending the payment information.

30. The system of claim 29, where the operations further comprise:
    determining the merchant POS device has one or more stored payment transactions; and
    forwarding each of the stored payment transactions to the payment system.

31. The system of claim 28, wherein the acts further comprise performing another risk analysis to determine a likelihood that the payment transaction will be approved in the future.

32. The system of claim 31, wherein the operations further comprise:
    determining the payment system has one or more stored payment transactions; and
    forwarding each of the stored payment transactions to the other computing device of the payment processing system.

33. The system of claim 28, where the operations further comprise:
    calculating a wait time, where the wait time is within a range of an average round trip time for a successfully processed transaction; and
    waiting the wait time before causing display of the indication.

34. The system of claim 28, wherein:
the one or more risk factors associated with the data regarding the payment transaction include one or more of the following: a value of the payment transaction, description of the payment transaction, itemization of the payment transaction, a type of transaction input, a signature, or an image of the payment transaction.

35. The system of claim 28, wherein:
the one or more risk factors associated with the data regarding the customer includes one or more of the following: a number of already stored transactions, a total value, where the total value is a sum of the value of the payment transaction and values of one or more already stored transactions, prior transactions, a type of payment card, or customer account information, wherein the customer account information includes a name, contact information, or location of the customer.

36. The system of claim 28, wherein:
the one or more risk factors associated with the data regarding the merchant includes one or more of the following: a classification of the merchant, merchant transaction history, merchant account information, where the merchant account information includes age, name, or contact information of the merchant, merchant location, locations of transactions conducted with the merchant, operating system of merchant device, or a type of a financial account of the merchant.

37. The system of claim 28, wherein the payment information is encrypted using a key before the storing, where the key is obtained from the payment system.

38. The system of claim 28, wherein determining that the first network connection to the computing device in the payment system is online occurs after an interval of time.

39. The system of claim 28, wherein the first network connection is a cellular data connection to an Internet.

40. The system of claim 28, wherein
the operations further comprise:
    updating data associated with at least one of (i) the one or more risk factors associated with data regarding the payment transaction, (ii) the one or more risk factors associated with data regarding the customer, or (iii) the one or more risk factors associated with data regarding the merchant after determining that the network connection to the computing device in the payment system is online.

41. The system of claim 28, wherein:
data associated with at least one of (i) the one or more risk factors associated with data regarding the payment transaction, (ii) the one or more risk factors associated with data regarding the customer, or (iii) the one or more risk factors associated with data regarding the merchant is stored on the merchant POS device.

42. The system of claim 28, wherein
the operations further comprise:

updating the risk algorithm model after determining that the first network connection to the computing device in the payment system is online.

* * * * *